United States Patent [19]
Keene

[11] Patent Number: 5,934,161
[45] Date of Patent: Aug. 10, 1999

[54] WIRE CUTTING AND STRIPPING APPARATUS

[75] Inventor: Harold J. Keene, Waukesha, Wis.

[73] Assignee: Artos Engineering Company, Waukesha, Wis.

[21] Appl. No.: 08/912,415

[22] Filed: Aug. 18, 1997

[51] Int. Cl.$^6$ ........................................... H02G 1/12
[52] U.S. Cl. .............................................. 81/9.51; 29/564.4
[58] Field of Search ................................. 81/9.51; 30/329

[56] References Cited

U.S. PATENT DOCUMENTS

| | | | |
|---|---|---|---|
| 4,838,129 | 6/1989 | Cope | 81/9.51 |
| 5,317,812 | 6/1994 | McMillin et al. | |
| 5,398,573 | 3/1995 | Wollermann | |
| 5,664,324 | 9/1997 | Hoffa et al. | 81/9.51 |

*Primary Examiner*—David A. Scherbel
*Assistant Examiner*—Daniel G. Shanley
*Attorney, Agent, or Firm*—Andrus, Sceales, Starke & Sawall

[57] ABSTRACT

An improved apparatus for cutting and stripping insulated wire. The apparatus includes a pair of cutting heads which are mounted on a supporting structure in opposed relation and each head includes a cutting blade and a stripping blade which is located downstream of the cutting blade. The insulated wire is fed between the cutting heads by a pair of endless belt feed units, one of which is located upstream of the heads and the other is located downstream of the heads. Each feed unit includes an endless timing belt, and the belts of each feed unit cooperate to move the wire in both a downstream and upstream direction during the programmed sequence of operation. The belts of each feed unit are moved in a direction toward each other by a chain drive and a torsion spring is operably connected to the chain drive in a manner such that operation of the chain drive in a direction to move the belts toward each other will increase the force of the torsion spring to provide a yieldable force against the wire. The cutter blades are mounted for pivotal movement in a lateral direction relative to the direction of wire movement, so that the cutter blades during the programmed sequence can be moved to an inoperative position. The insulated wire is fed from the upstream feed unit to the cutter blades by a guide tube assembly and the guide tube assembly can be pivoted from a guiding position to a non-guiding position where the guide tube assembly will not interfere with upstream movement of a cut length of wire during the program sequence.

17 Claims, 13 Drawing Sheets

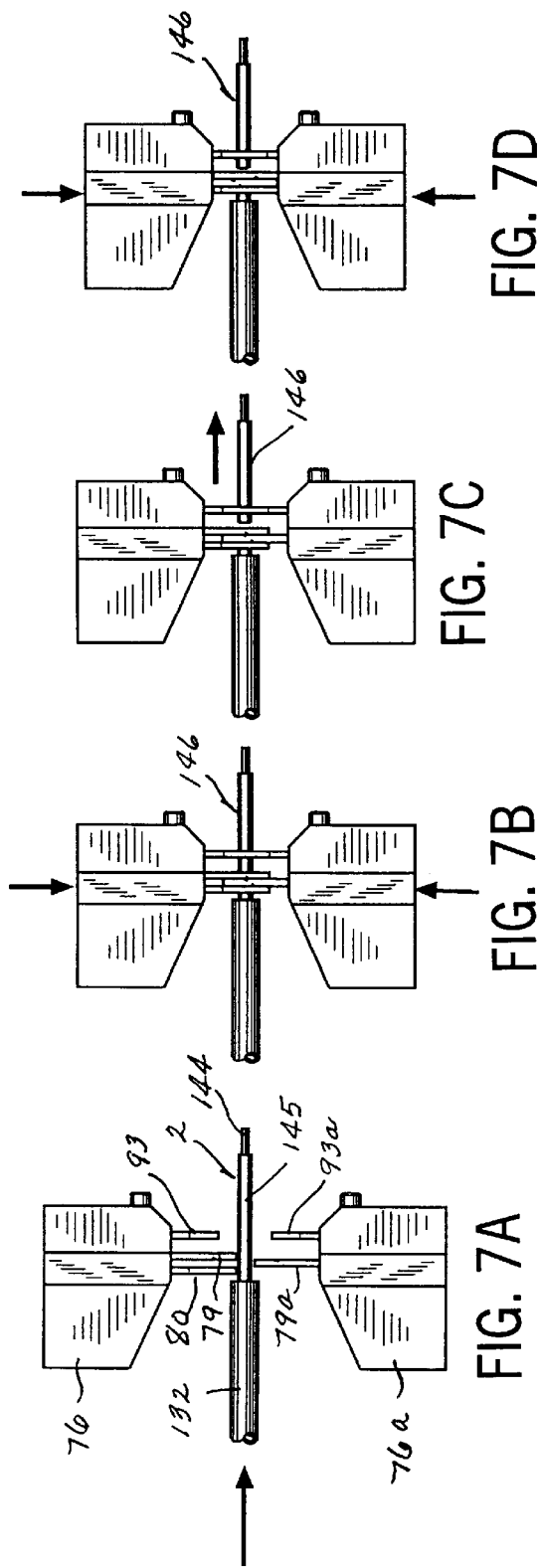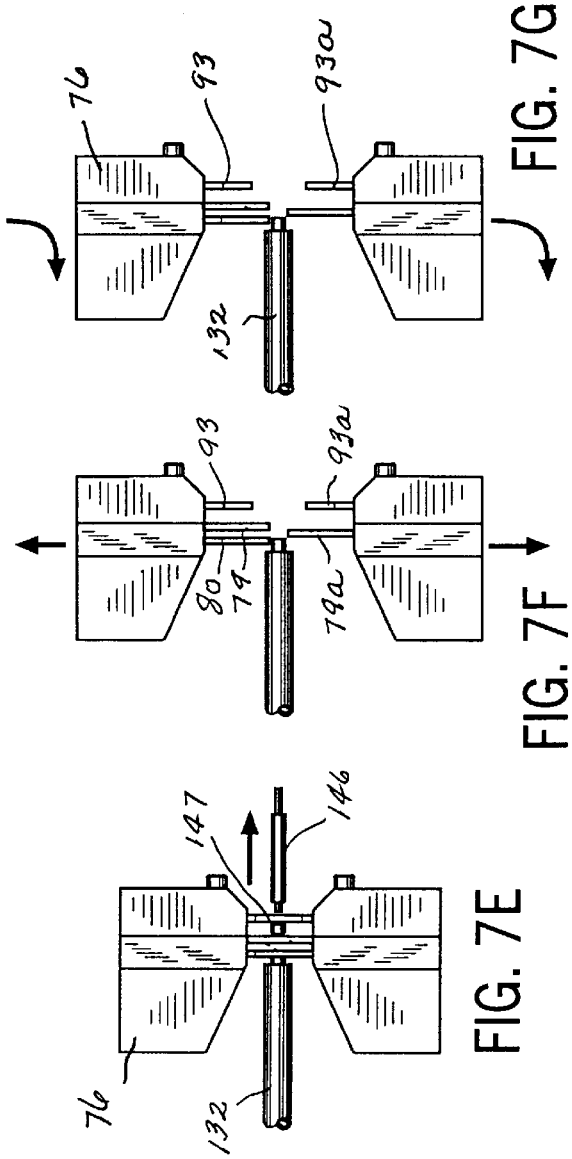

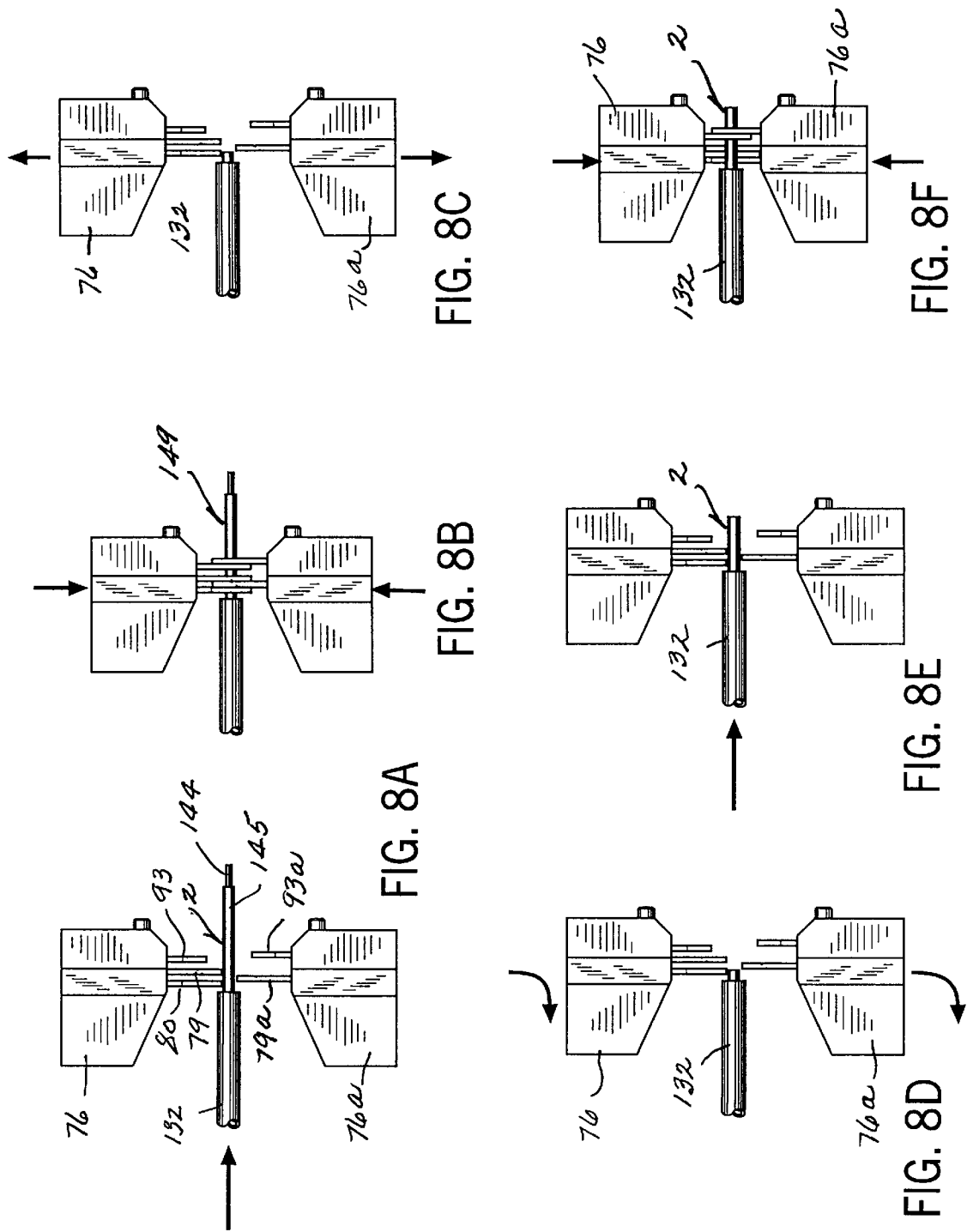

WIRE CUTTING AND STRIPPING APPARATUS

BACKGROUND OF THE INVENTION

In a conventional wire cutting and stripping apparatus, insulated wire is fed axially to a cutting and stripping unit where a given length of wire is cut or severed and slugs of insulation are cut and stripped from the ends of the cut length.

In one type of cutting and stripping apparatus, the cutting unit includes a pair of cooperating cutting blades, and cooperating stripping blades are located both downstream and upstream from the cutting blades. After a predetermined length of wire has been fed by an upstream feeding unit to the cutting and stripping unit, the cutting blades are moved toward each other causing the blades to sever the wire and simultaneously cause the stripping blades to cut the insulation. Wire gripping units, located both upstream and downstream from the cutting and stripping unit, grip the wire as well as the cut length and move the wire and cut length in opposite directions, thereby stripping the insulation from the ends of the wire and from the cut length.

In other conventional cutting and stripping apparatus, only a single pair of stripping blades are employed, which are located downstream of the cutting blades. In this type of apparatus, the wire is fed in both forward and reverse directions by feed units located both upstream and downstream of the cutting and stripping unit to provide the programmed cutting and stripping action.

SUMMARY OF THE INVENTION

The invention is directed to an improved wire cutting and stripping mechanism. In accordance with the invention, the cutting and stripping unit includes a pair of opposed cutter heads each having a cutter blade and a stripping blade located down-stream of the cutter blade. Wire feed units are located both upstream and downstream of the cutting and stripping unit and serve to feed the insulated wire to the cutting and stripping unit.

Each feed unit is composed of a pair of endless timing belts located on opposite sides of the insulated wire and each timing belt is carried by a pair of timing pulleys. The timing pulleys associated with each belt are connected to driven pulley shafts that are journaled in slide blocks mounted for sliding movement in a direction toward and away from each other on the frame of the apparatus. A chain drive is operably connected to the side blocks and operation of the chain drive in one direction will move the blocks and the belts in a direction toward each other to grip the wire, while operation of the chain drive in the opposite direction will move the blocks and belts away from each other to release contact with the wire. As a feature of the invention, a torsion spring is operably connected to the chain drive in a manner such that operation of the chain drive to move the blocks toward each other will increase the force of the torsion spring to thereby provide a yieldable force on the wire.

A guide tube assembly is located between the upstream feed unit and the cutting and stripping unit and serves to guide the wire to the cutting and stripping unit. As a further aspect of the invention, the guide tube assembly can be pivoted from its normal guiding position to a non-guiding position, so that the cut length of wire can be moved in an upstream direction without interference from the guide tube in order to cut and strip the insulation from the trailing end of the cut length of the wire.

As a further feature of the invention, each cutting blade is mounted for pivotal movement in a lateral direction relative to the direction of movement of the wire through the apparatus. When it is desired to strip a slug of insulation of substantial length from the cut length of wire, the cutting blades are moved to the pivoted or inoperative position, so that they will not interfere with upstream movement of the cut length of wire during the stripping operation.

The cutting heads are moved in a direction toward and away from each other by a ball screw drive. The ball screw drive includes a screw having opposite threads on its two ends and nuts are operably engaged with each thread and are connected to slides which in turn are connected to the respective cutting heads. Rotation of the screw in one direction will thus move the nuts, slides and cutting heads in a direction toward each other and conversely, rotation of the screw in the opposite direction will move the nuts, slides and cutting heads away from each other. Movement of the cutting heads toward each other will cause the cutting blades to cut and sever the wire and will similarly cause the stripper blades to cut the insulation. To eliminate slack in the ball screw drive, a resilient member, such as a spring, is mounted on one of the slides and is compressed by the other slide as the slides are moved in a direction toward each other, so that the force of the spring will take up any slack in the ball screw drive.

The apparatus utilizes a single pair of cooperating cutting blades and a single pair of stripping blades. By pivoting the cutting blades out of alignment with the path of travel of the wire, the length of the stripped insulation can be substantially increased.

The mechanism is capable of cutting and stripping wire of various gauges and can further be employed for cutting and stripping two wires in side-by-side relation for cutting and stripping flat cable or tubing.

Other objects and advantages will appear during the course of the following description.

DESCRIPTION OF THE DRAWINGS

The drawings illustrate the best mode presently contemplated of carrying out the invention.

In the drawings:

FIGS. 7A–7K illustrate the sequence of operations in cutting and stripping wire;

FIGS. 8A–8L show a sequence of operations in cutting and stripping an increased length of insulation from the wire;

DESCRIPTION OF THE INVENTION ILLUSTRATED EMBODIMENT

Figure 1:
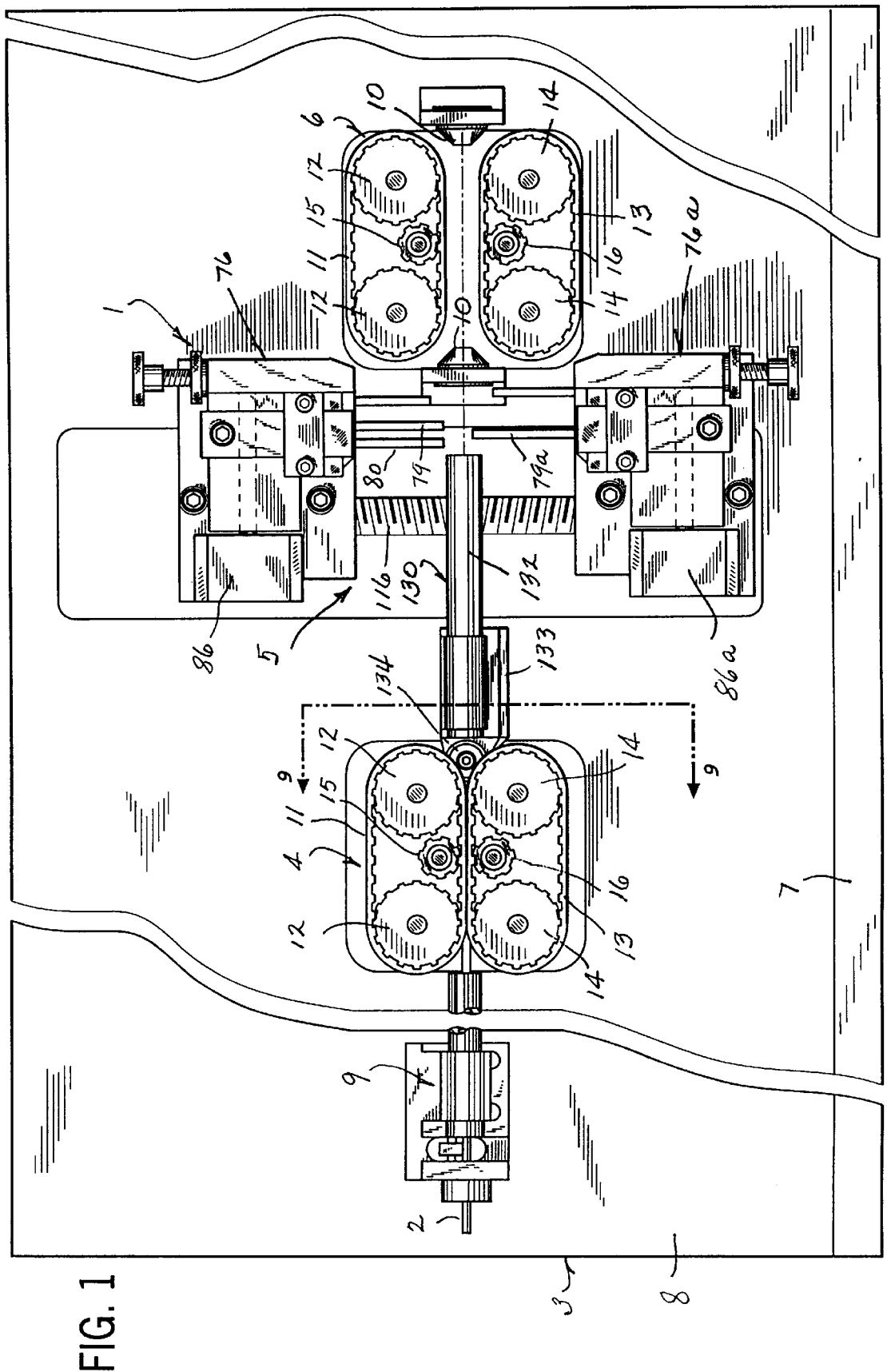
FIG. 1 is a front elevation of the cutting and stripping apparatus of the invention.

The drawings illustrate an apparatus 1 for cutting insulated wire 2 and stripping the insulation from the ends of the cut wire section.

The apparatus includes a frame or supporting structure 3 and an upstream wire feeding unit 4 is mounted on the supporting structure upstream of a cutting and stripping unit 5 and a downstream feed unit 6 is located on the opposite side of cutting and stripping unit 5 from feed unit 4. Feed units 4 and 6 grip and feed the wire 2 axially to cutting and stripping unit 5 where the wire is cut and insulation is stripped from the cut ends of the wire.

Supporting structure 3 includes a generally flat base 7 and a vertical plate 8 extends upwardly from one end of base 7. A guide tube assembly 9 is mounted on plate 8 and serves to guide wire 2 to the upstream feed unit 4, while generally conical guides 10 are located both upstream and downstream of feed unit 6 and guide the wire 2 in movement through the feed unit.

Feed units 4 and 6 are similar in construction and each feed unit 4,6 includes an upper endless feed belt 11 which is mounted on a pair of pulleys 12, and a lower endless belt 13 which is trained over a pair of pulleys 14. Belts 11 and 13 are of a timing belt type having a plurality of spaced ribs or cleats which engage teeth on the respective timing pulleys 12 and 14.

An idler pulley 15 is mounted between pulleys 12 and is in contact with the lower run of belt 12, and similarly an idler pulley 16 is located between pulleys 14 and is engaged with the upper run of belt 13.

Belts 11 and 13 are adapted to engage opposite sides of wire 2, and when driven, will move the wire in either a downstream or an upstream direction.

Figure 3:
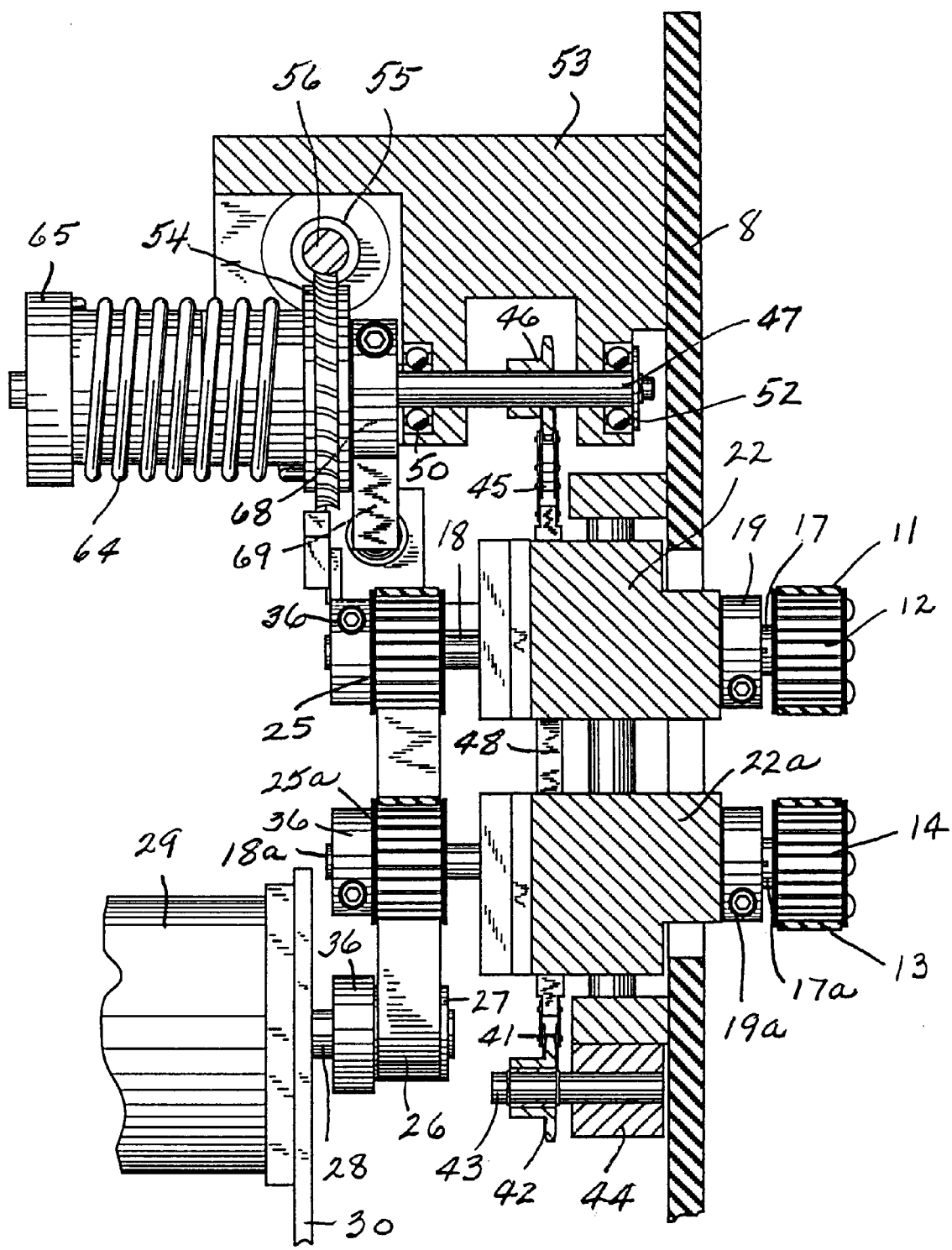
FIG. 3 is a section taken along line 3—3 of FIG. 2.

As best seen in FIG. 3, upper pulleys 12 are each provided with a longitudinally split hub 17 which is secured to one end of a shaft 18 by a clamping collar 19. Similarly, the lower pulleys 14 are provided with split hubs 17a which are secured to shafts 18a by clamping collars 19a.

Figure 5:
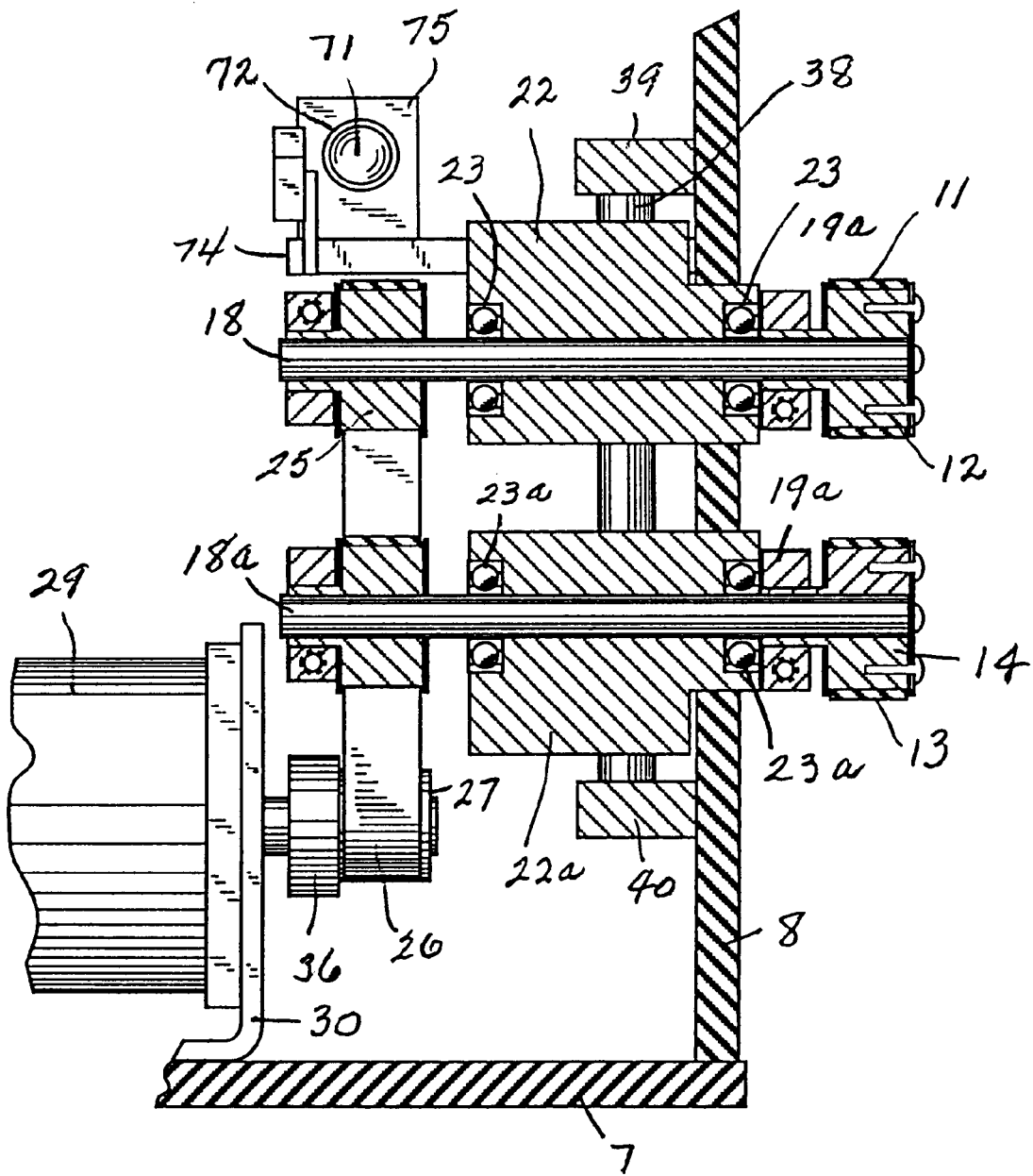
FIG. 5 is a section taken along line 5—5 of FIG. 2.

The upper shafts 18 are journaled within an upper slide or block 22, while the lower shafts 18a are similarly journaled within a lower block or slide 22a. The shafts 18 and 18a are journaled within the respective blocks 22 and 22a by bearing assemblies 23 and 23a, as shown in FIG. 5.

The opposite or inner end of each shaft 18 carries a pulley 25 and similarly the opposite end of each shaft 18a carries a pulley 25a, and a timing belt 26 is engaged with the pulleys 25 and 25a. Belt 26 is also trained over a drive pulley 27 which is secured to the outer end of shaft 28 of motor 29. As seen in FIG. 5, motor 29 is mounted on a vertical plate 30 that extends upwardly from base 7.

Figure 4:
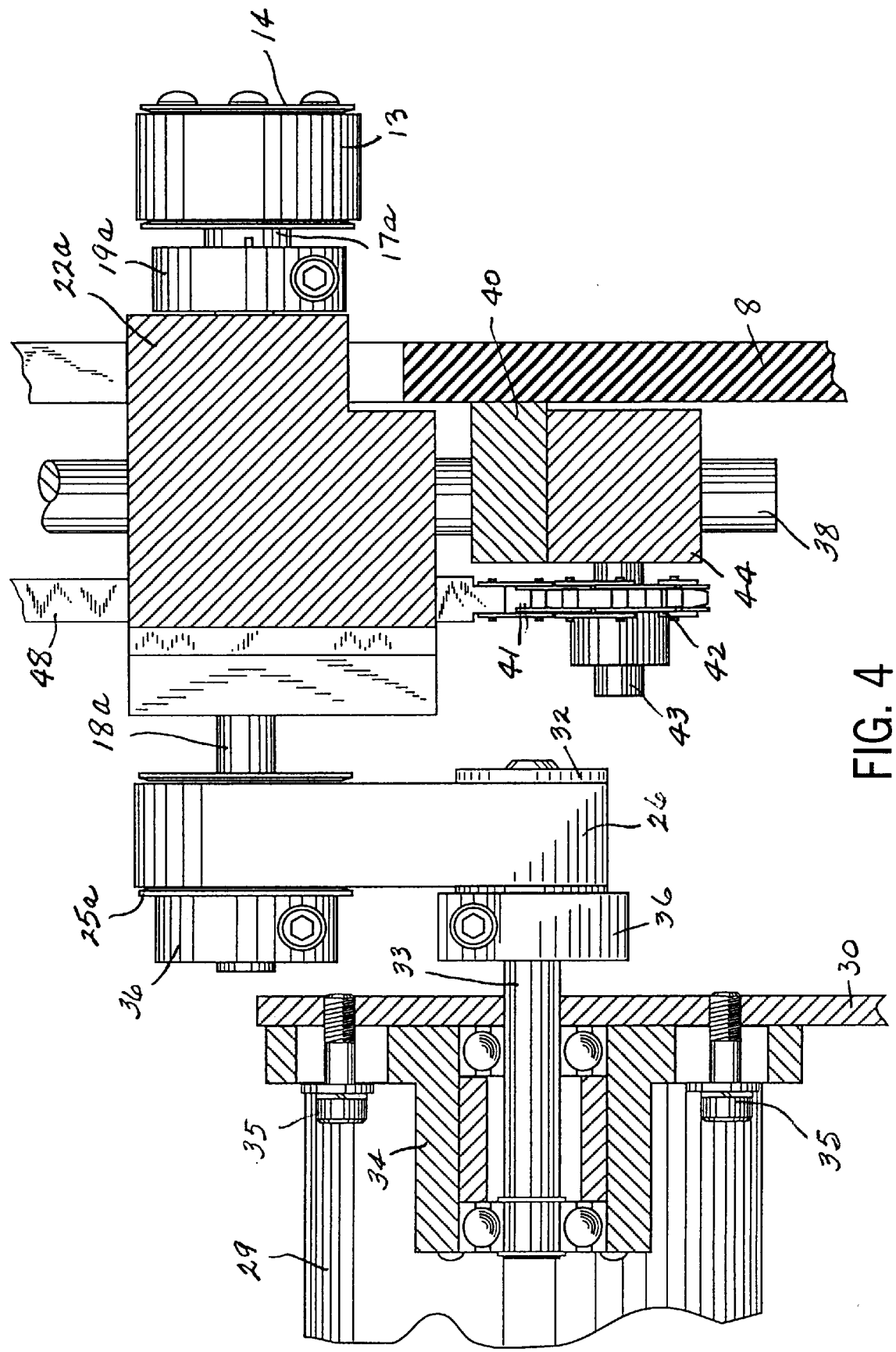
FIG. 4 is a section taken along line 4—4 of FIG. 2.

In addition, drive belt 26 is also engaged with an adjustable idler pulley 32 which is mounted on plate 30. Idler pulley 32 is carried on a shaft 33 which is journaled by suitable bearings in hub 34, and the hub in turn, is adjustably mounted to the vertical plate 30. As shown in FIG. 4, bolts 35 extend through elongated slots in the flange of hub 34 and are threaded in holes in plate 30, thus providing a belt tensioning adjustment. The pulleys 25, 25a, 27 and 32 are provided with split hubs which are secured to the respective shafts by suitable clamping collars 36.

With this drive mechanism, operation of motor 29 will operate through drive belt 26 to rotate shafts 18 and 18a to drive belts 11 and 13 in opposite directions and thereby feed wire 2 either in a downstream or upstream direction, depending on the rotation of motor shaft 28. As previously mentioned, the feed belts 10 and 13 of the downstream feed unit 6 are driven in the same manner as that described with respect to the drive belts 10 and 13 of upstream feed unit 4.

Figure 2:
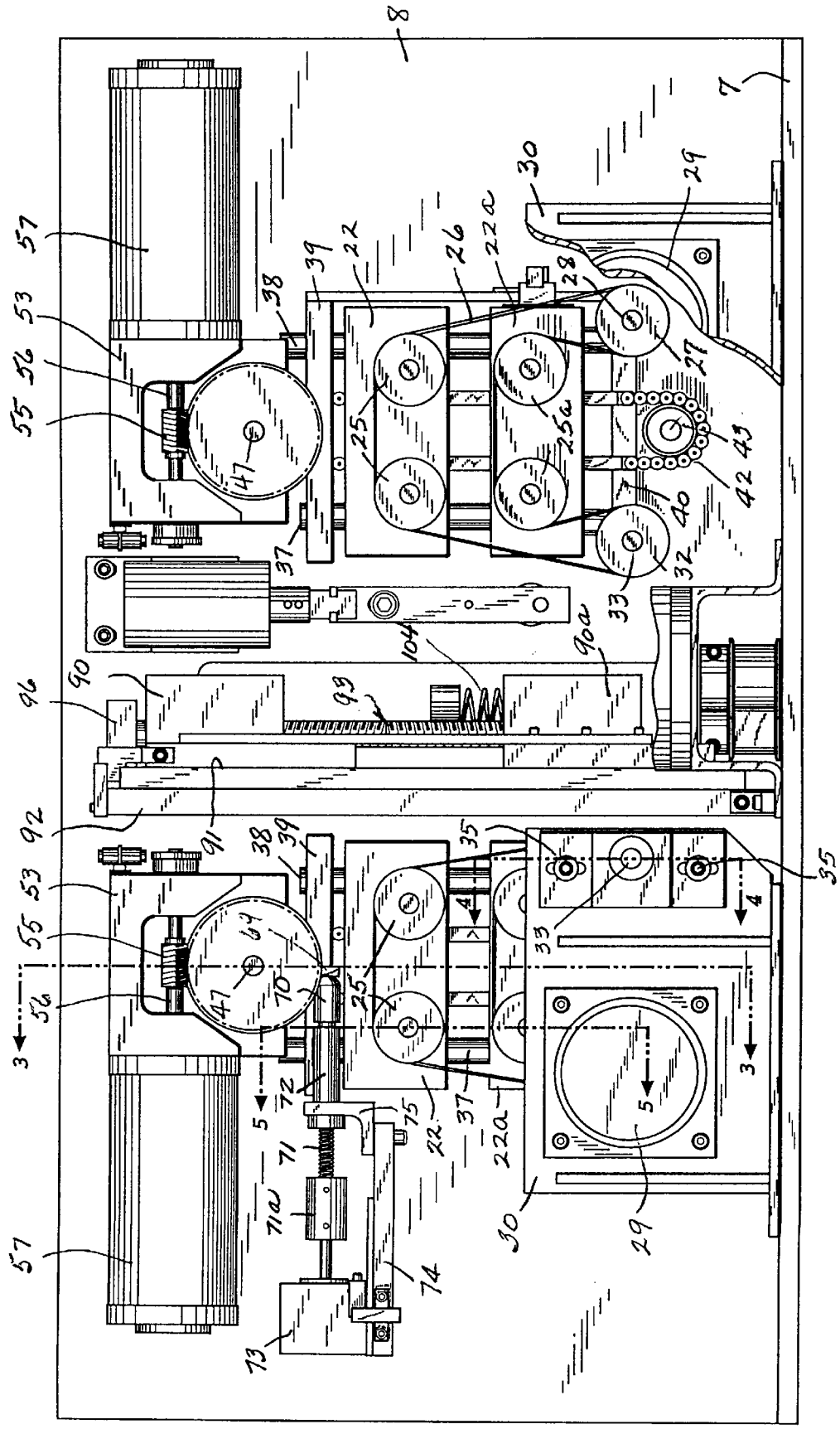
FIG. 2 is a rear elevation of the apparatus.

The blocks 22 and 22a of both feed units 4 and 6 are adapted to be moved toward and away from each other to move the feed belts 11 and 13 into and out of contact with wire 2. Blocks 22 and 22a, which carry the feed belts 11 and 13, respectively, are mounted for vertical sliding movement on a pair of guide rods 37 and 38. As shown in FIG. 2, the upper ends of guide rods 37 and 38 are secured within openings in an upper plate 39 that extends inwardly from plate 8, while the lower ends of guide rods 37 and 38 are secured within openings in lower plate 40 which is parallel to plate 39. Plates 39 and 40 are secured to the rear surface of plate 8.

To move the blocks 22 and 22a of each feed unit 4 and 6 on the respective guide rods 37 and 38, chain drives are utilized. Each chain drive includes a lower chain section 41, which is engaged with a lower sprocket 42 which is journaled on shaft 43 that extends outwardly from block 44 that is mounted to the underside of plate 40, as seen in FIG. 4 and an upper chain section 45 engaged with an upper sprocket 46 that is mounted on shaft 47, as best shown in FIG. 3. Chain sections 41 and 45 are connected by straps 48 and the straps are secured to blocks 22 and 22a. With this construction, rotation of the drive shaft 47 and the upper drive sprocket 46 in one direction will move the chain sections to cause the blocks 22 and 22a to move toward each other, while rotation of shaft 47 in the opposite direction will move the blocks 22 and 22a in a direction away rom each other.

As best seen in FIG. 3, one end of shaft 47 is journaled within a pair of bearings 50 and 52 which are carried by upper support member 53 that is mounted to the upper end portion of plate 8.

A sprocket 54 is secured to the central portion of shaft 47 and the teeth of sprocket 54 are engaged with a worm gear 55, which is mounted on shaft 56 of motor 57. Motor 57 is attached to support member 53. Thus, rotation of motor shaft 56 will operate through worm gear 55 and sprocket 54 to drive shaft 47 and thus move the chain drive causing vertical movement of blocks 22 and 22a in a direction toward and away from each other.

Movement of the blocks 22 and 22a of feed units 4 and 6 in a direction toward each other will cause the feed belts 11 and 13 to engage the wire 2. In addition, each feed unit 4 and 6 includes a tensioning mechanism for applying tension through the feed belts 11 and 13 to the wire 2 when the feed belts are in the closed position. In this connection, a torsion spring 64 is located concentrically around the outer end of shaft 47, as shown in FIG. 3, and one end of the torsion spring is connected to sprocket 54, while the opposite end of the torsion spring is connected to an annular end cap 65. With this construction, continued rotation of drive shaft 47 and sprocket 54 after the feed belts 11 and 13 are in contact with wire 2 will act to deflect or load the torsion spring 64 to apply tension or a yieldable force to the wire through the belts 11 and 13 of each feed unit 4 and 6.

The invention also includes a mechanism associated with the downstream feed unit 6 for controlling the gap between the feed belts 11 and 13 of that feed unit. The control mechanism includes a collar 68 which is secured to shaft 47 adjacent to sprocket 54, as shown in FIG. 3, and a finger 69 extends downwardly from collar 68. The lower end of the finger 69 is adapted to engage a cap 70 on the end of an adjusting screw 71 as shaft 47 is rotated. Screw 71 is threaded within a fixed sleeve 72 and the opposite end of the screw is connected by coupling 71a to the drive shaft of a step motor 73, as seen in FIG. 2. Motor 73 is mounted for sliding movement on a plate 74 that extends outwardly from vertical support 8, and plate 74 also carries an angle bracket 75 that is secured to the outer end of sleeve 72. Through operation of motor 73, the motor and screw 71 will move longitudinally with respect to fixed sleeve 72, and the cap 70 on the end of the screw 71 provides a stop which is engaged by finger 69 as shaft 47 is rotated to thereby limit the closed position of the feed belts 11 and 13 of the downstream feed unit 6.

Figure 11:
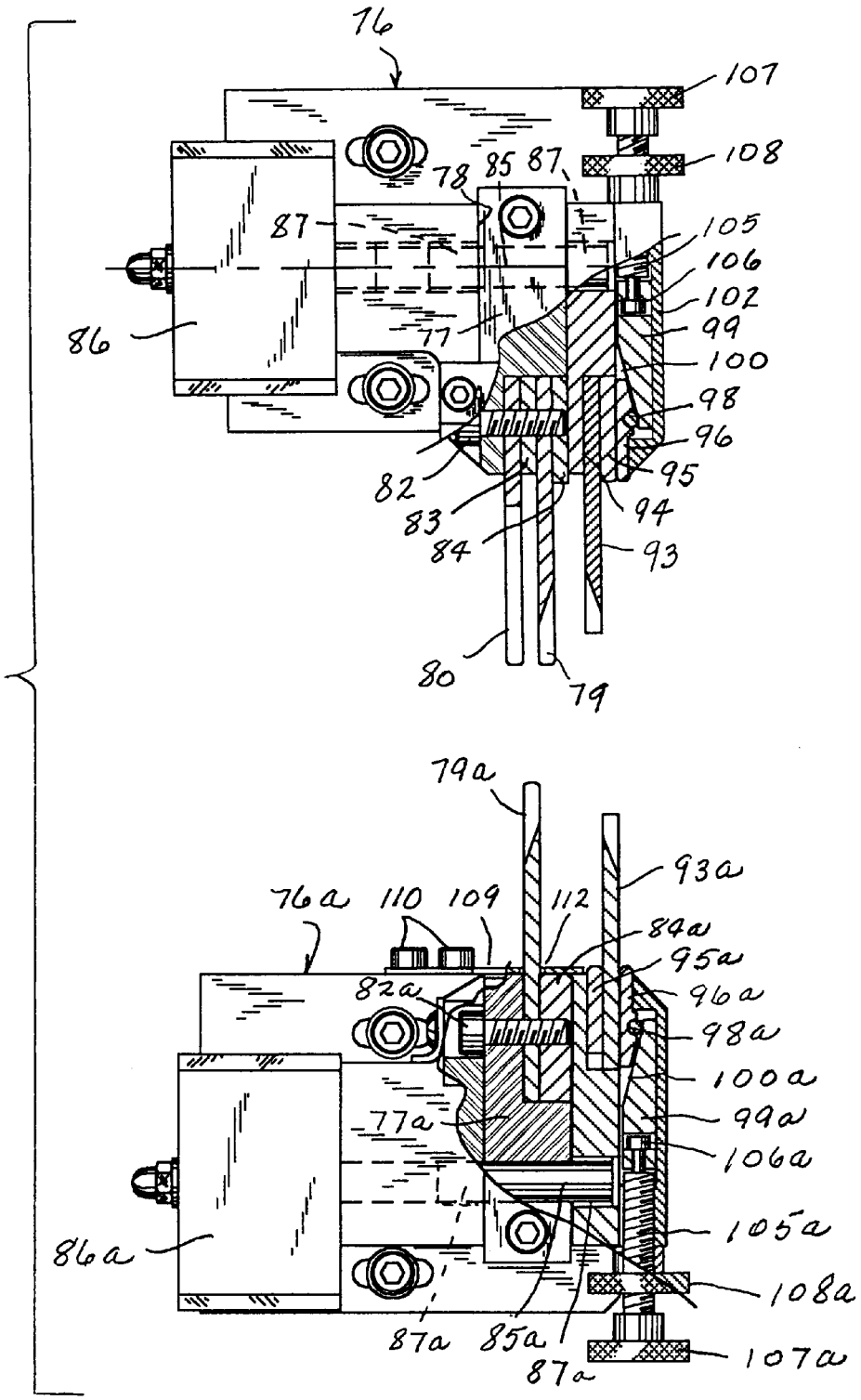
FIG. 11 is an enlarged fragmentary front elevation with parts broken away showing the cutting heads.

The cutting and stripping unit 5 includes a pair of vertically spaced cutting heads, namely an upper cutting head 76 and a lower cutting head 76a which are similar in construction. With regard to cutting head 76, a blade holder 77 is mounted for pivoting movement with a recess 78 in the upper head. Blade holder 77 carries a cutting blade 79 and a backing blade 80 which is spaced from the cutting blade as shown in FIG. 11. Blades 79 and 80 are mounted within a recess in the outer end of the blade holder 77 by a screw 82 which extends through aligned openings in the blade holder 77, the backing blade 80, a spacer 83, the cutting blade 79, and is threaded in a clamping plate 84. By threading down screw 82, the cutting blade 79 and the backing blade 80 will be firmly secured to the holder 77.

Figure 12:
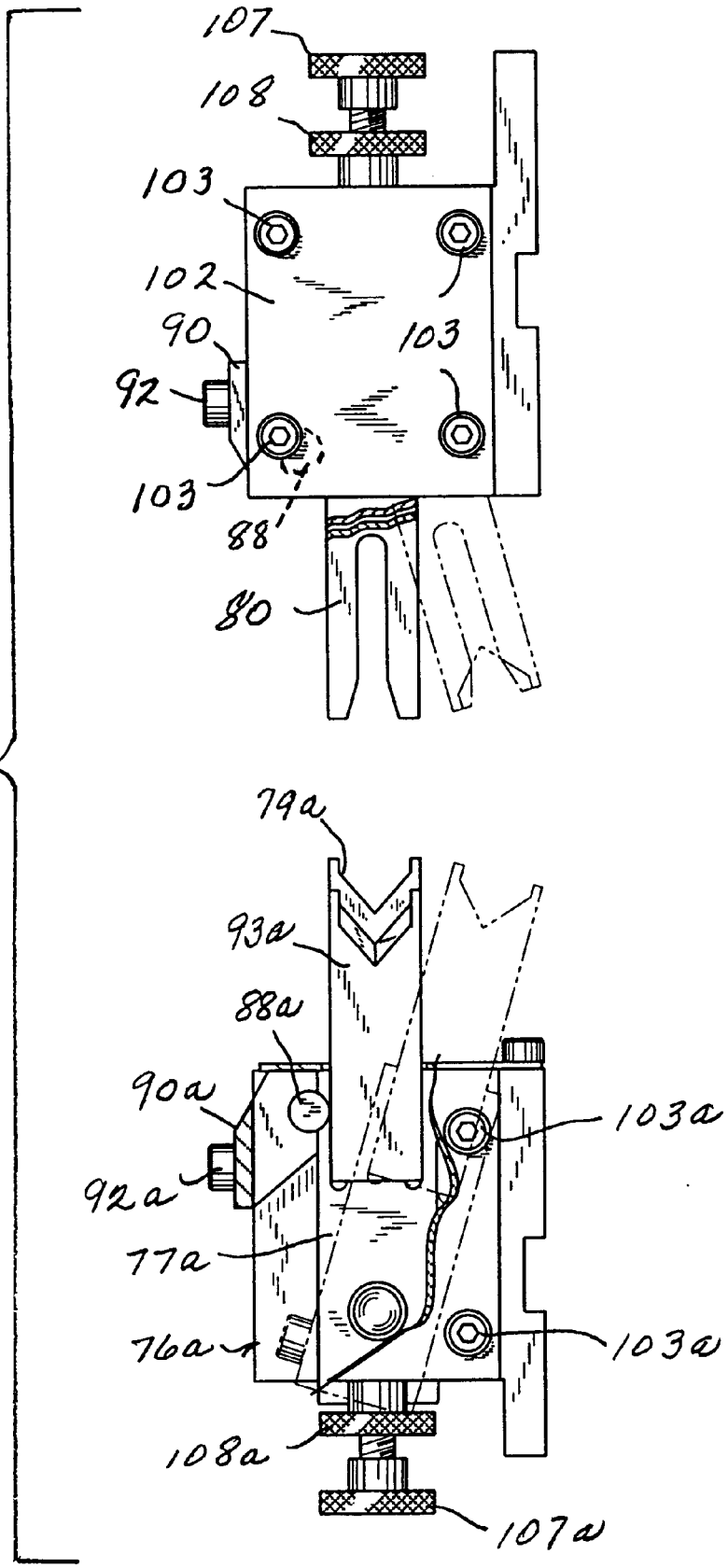
FIG. 12 is an end view of the structure shown in FIG. 11.

Blades 79 and 80 are adapted to be pivoted from a generally vertical cutting position, to an angular non-cutting position, as shown by the phantom lines in FIG. 12. To provide this pivoting action, the inner end of blade holder 77 is secured to the central portion of a drive shaft 85 of motor 86 that is mounted on the cutting head 76. Shaft 85 is journaled within a pair of bearings 87 that are located in either side of the blade holder 77. Through operation of motor 86, the blade holder 77 and blades 79 and 80 can be pivoted laterally.

When the cutting blade 79 is in the upright cutting position, the center line of the blade is slightly offset from the vertical and a side edge of the blade is engaged with a stop 88, as best seen in FIG. 12. Positioning the cutting blade 79 in a slightly off-set position will ensure that the blade will not pivot to the release position during the cutting operation.

Stop 88 takes the form of a pin formed of a resilient material such as polyurethane. The stop pin 88 is mounted with a block 90 that is attached to the side of the cutting head by a pair of screws 92. The use of the resilient stop 88 reduces the noise which could occur if the blade is pivoted against a metal stop.

Upper cutting head 76 also carries a stripping blade 93 which is spaced downstream from the cutting blade 79 and is adapted to cooperate with a similar stripping blade on the lower head to strip the insulation from the wire. Stripping blade 93 is mounted within a recess 94 in the cutting head 76, and a spacer 95 and clamp plate 96 are located in the recess outwardly of the stripping blade 93, as best seen in FIG. 11. Clamping plate 96 has an outer tapered surface, and a groove is formed in the clamping plate adjacent the end of the tapered surface. Pin 98 is received within the groove.

A cam mechanism acts against the tapered surface and pin 98 of the clamping plate to urge the clamping plate inwardly toward the stripping blade 93 to firmly secure the stripping blade to the cutting head 76. The cam mechanism includes a slidable cam plate 99 having a tapered cam surface 100 which is adapted to engage the tapered surface and pin 98 of clamp plate 96. Cam plate 99 is mounted for sliding movement within a recess in cover 102, which is secured to the end of the upper head 76 via screws 103. To move the clamping plate 99, a screw 105 is threaded in an opening in cover 102 and the inner end of the screw 105 carries an enlarged head 106 which is received in an opening in cam plate 99, thus providing a connection between screw 105 and the cam plate. The outer end of screw 105 which is located outside of the cover 102, carries a hand knob 107, and a lock nut 108 is threaded on the screw and is located inwardly of the hand knob. By threading down screw 105 through use of hand knob 107, the cam plate 99 will be moved within the recess in the cover 102 and will act against the tapered surface 100 and pin 98 of the clamp plate 96 to thereby wedge the clamp plate 96 laterally against the stripping blade 93 to firmly secure the stripping blade to the cutting head 76. Lock nut 108 can be tightened down to hold the stripping blade 93 in the clamped position. This construction provides a convenient mechanism for assembling and removing the stripping blade 93 from the cutting head 76.

The cutting head 76a has substantially the same construction as the upper head 76 and similar numeral with the suffix "a" applied to the components of the lower head. However, the lower head 76a does not include a backing blade and thus the cutting blade 79a is secured to the blade holder 77a by screw 82a that extends through aligned openings in the holder, as well as in the cutting blade and is threaded into a clamping plate 84a. In addition, the lower head 76a includes a cover plate 109 which prevents debris from falling into the recess in the cutting head 76a which contains the blade holder 77a. Cover plate 109, as seen in FIG. 11, is secured to the upper surface of the cutting head 76a by a pair of screws 110, and the plate includes an elongated slot 112 which receives the cutting blade 79a. The elongated slot 112 accommodates the pivotal movement of the cutting blade 79a, as previously described.

Each cutting blade 79,79a is of conventional construction and includes a generally V-shaped sharpened cutting edge, and the two cutting edges cooperate when the two blades are moved together to cut the wire and insulation. Backing blade 80 provides backing or support for the cutting blades 79 and 79a, and the outer or distal end of the backing blade is provided with a U-shaped recess which receives the wire during the cutting operation. Stripping blades 93,93a are of conventional construction and each includes an outer generally V-shaped cutting edge which is adapted to penetrate and cut the insulation on wire 2.

The axis of each shaft 85,85a is off-set from the longitudinal center line of the respective blade holders 77 and 77a, and thus the cutting force will move the blade holders 77,77a against the respective stops 88,88a. This ensures that during the cutting operation the cutting blades 79,79a will not pivot to the release or non-cutting position.

Figure 6:
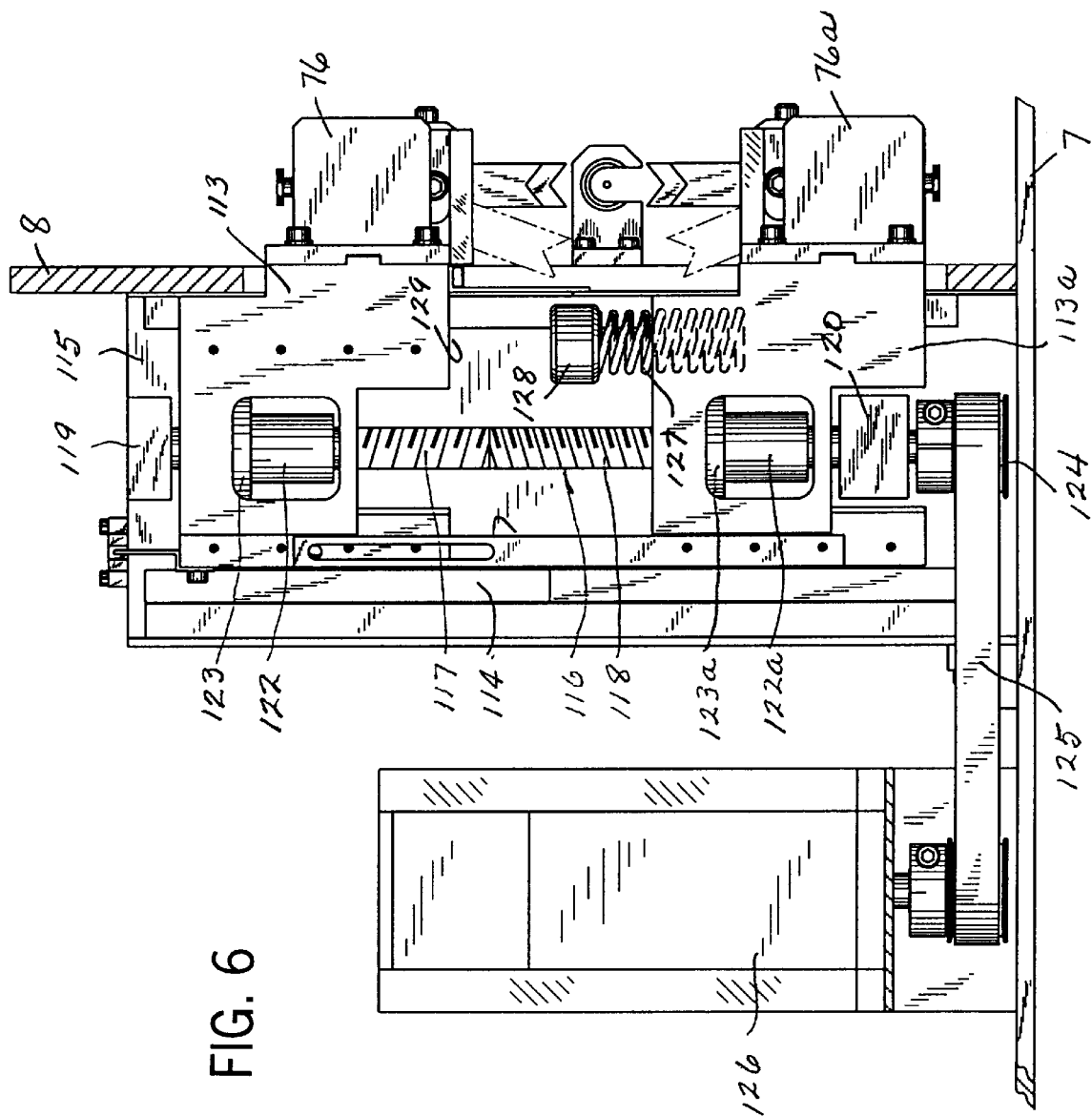
FIG. 6 is a side elevation showing the ball screw drive for moving the cutting heads.

Cutting heads 76,76a are mounted for movement in a direction toward and away from each other. As illustrated in FIG. 6, each cutting head 76,76a is connected to a slide block 113,113a by screws or other suitable fasteners, and each slide block is mounted for sliding vertical movement in a guideway 114 formed in vertical support plate 115 that extends rearwardly from plate 8. To drive the slide blocks 113,113a in a direction toward and away from each other, a vertical ball screw 116 is operably connected to the slide blocks 113 and 113a and the upper section 117 of the ball screw has a right hand thread, while the lower portion or section 118 of the screw has the opposite or a left hand thread. Screw 116 is journaled for rotation in bearing assemblies 119 and 120 which are supported by vertical plate 115. A pair of ball nuts 122,122a are adapted to engage the threaded sections 117 and 118, respectively, of screw 116. Each nut 122 and 122a is secured to a collar 123,123a which in turn are mounted to the respective slide block 113,113a by suitable screws or other connectors.

As seen in FIG. 6, the lower end of screw 116 carries a pulley 124 which is connected by a suitable drive belt 125 to the drive shaft of motor 126. Operation of the reversible motor 126 will operate through belt 125 to rotate screw 116 and move the slides 113,113a in a direction toward and away from each other.

To compensate for the play in the ball screw arrangement, a compression spring 127 is mounted within a suitable recess in the lower slide block 113a, and the upper end of spring 127 projects upwardly beyond the upper surface of the slide block, as shown in FIG. 6, and carries a plastic cap 128. When the slide blocks 113,113a are moved toward each other, the lower surface 129 of upper slide block 113 will engage cap 128 on spring 127, thus compressing the spring and compensating for the play in the ball screw drive.

Figure 9:
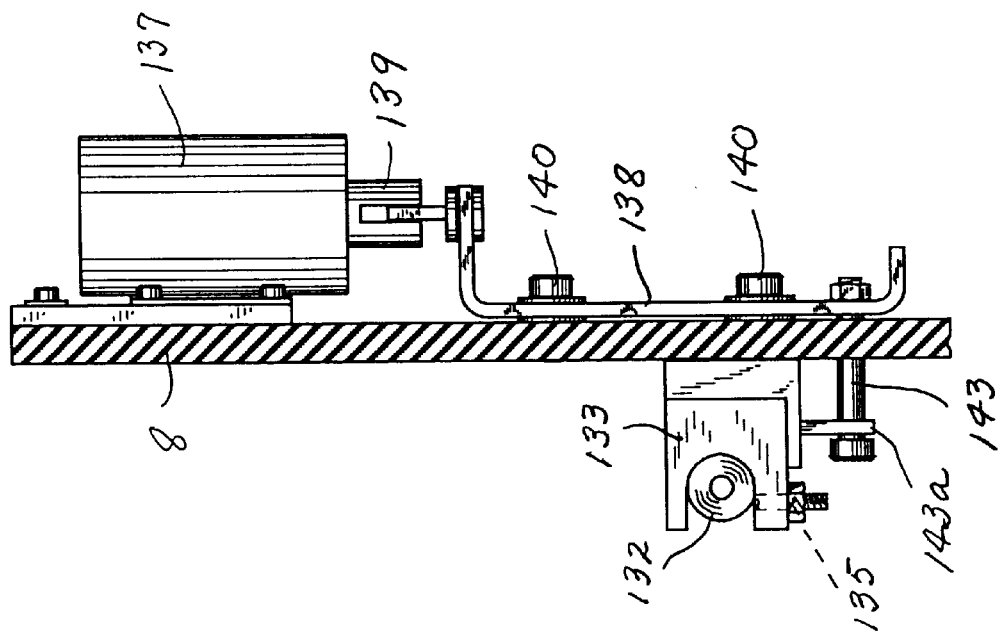
FIG. 9 is a section taken along line 9—9 of FIG. 1.
Figure 10:
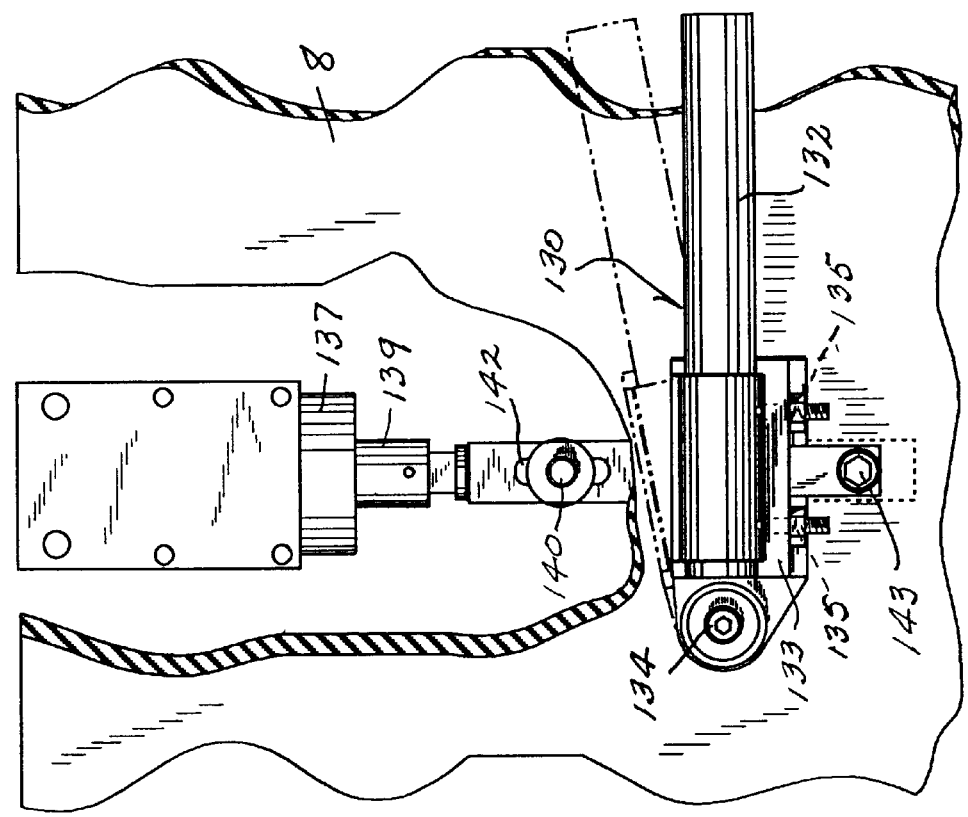
FIG. 10 is an enlarged fragmentary front elevation showing the pivotable guide tube assembly.

The insulated wire 2 is guided in travel from the upstream feed unit 4 to the cutting and stripping unit 5 by a guide tube assembly 130, which is mounted on the front face of plate 8, as best shown in FIGS. 9 and 10. Guide tube assembly 130 includes an elongated guide tube 132 that is movably mounted in a cradle 133 which is pivoted to plate 8 about a horizontal pivot axis 134. As best shown in FIG. 9, the outwardly facing side of the cradle 133 is open and is adapted to receive the generally cylindrical guide tube 132. A pair of detents 135 are mounted in holes in the lower portion of cradle 133 and serves to maintain the guide tube 132 within the cradle. The downstream end of the guide tube 132 terminates adjacent the cutting blades 79,79a, as shown in FIG. 1.

As a feature of the invention, the guide tube assembly 130 is adapted to be pivoted about pivot shaft 134 to a position, as shown by the phantom lines in FIG. 10, where it will not interfere with feeding of a cut length of wire 2 in an upstream direction. To pivot the cradle 133 and the guide tube 132 contained therein, a solenoid operated mechansim is employed. In this regard, a solenoid 137 is mounted on the rear surface of plate 8 and the upper horizontal leg of a generally L-shaped bracket 138 is secured to the solenoid plunger 139. The vertical leg of bracket 138 is attached to plate 8 by bolts 140 which extend through vertical elongated slots 142 in the leg, thus enabling bracket 138 to slide vertically relative to plate 8. The lower end of bracket 138 is connected via a pin 143 to a lug 143a on the underside of cradle 133. Pin 143, as seen in FIG. 11, extends through an opening in plate 8. Energizing solenoid 137 will retract plunger 139 and pivot the cradle 133 and guide tube 132 upwardly to the phantom position, as shown in FIG. 10.

FIGS. 7 and 8 illustrate the sequence of operation of the cutting and stripping mechanism of the invention. FIG. 7 represents the sequence of operations in which only a short length of insulation is stripped from the wire 2, while FIG. 8 illustrates a sequence of operations in which a longer length of insulation is stripped from the wire.

Figure 7K:
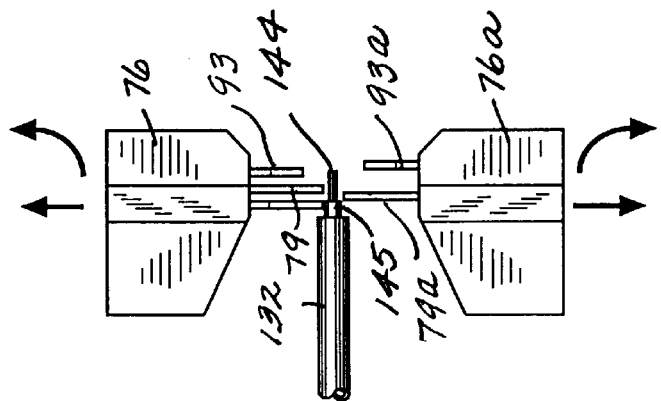

In accordance with a computerized program, the wire 2, which is composed of a metal core or conductor 144 and an outer layer or sheath of insulation 145, is fed through guide tube 132 to the cutting and stripping unit 5 through operation of the feed unit 4, as seen in FIG. 7A, so that a given length of wire projects downstream beyond the cutting blades 79,79a. As shown in FIG. 7B cutting blades 79 and 79a are then moved toward each other by operation of motor 126 to cut the insulation 145 and metal core 144 of the wire and provide a cut length 146.

The cut length of wire 146 is then moved in a downstream direction by operation of the feed unit 6, as shown in FIG. 7C to position a selected portion of the trailing end of cut length 146 between the stripping blades 93,93a Stripping blades 93 and 93a are then brought together through operation of the ball screw drive to cut the insulation from the trailing end portion of the cut length 146, as seen in FIG. 7D. The cut slug 147 of insulation is then stripped from the wire core 144 by movement of the cut length 146 of the wire in a downstream direction through operation of feed unit 6, as shown in FIG. 7E.

The cutting heads 76 and 76a are then moved apart through operation of ball screw drive, as shown in FIG. 7F, and the cutting blades 79 and 79a are then pivoted laterally to the phantom position through operation of the motors 86, as shown in FIG. 7G.

Figure 7J:
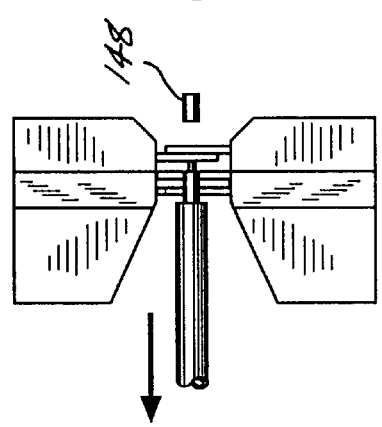
Figure 7I:
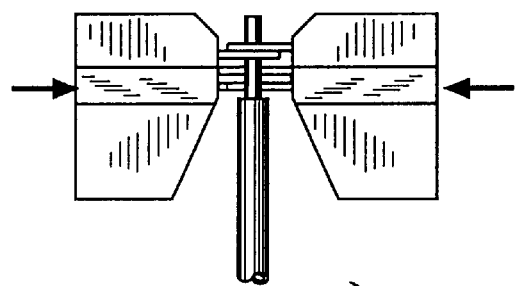
Figure 7H:
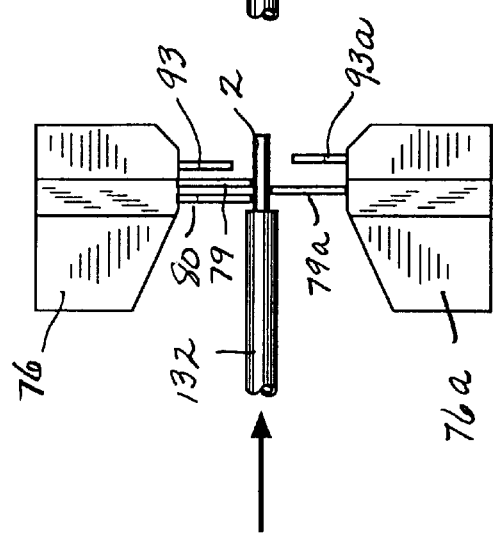

With the cutting blades 79,79a in a non-interfering pivoted position, the wire 2 is then fed downstream by feed unit 4, as shown in FIG. 7H, to position the leading end portion of the wire 2 between the stripper blades 93 and 93a. The stripping blades are then closed, as shown in FIG. 7I, thereby cutting the insulation on the wire, and as the cutting blades are in the pivoted position, they will not contact the wire as the stripping blades are moved into stripping position.

As shown in FIG. 7J, the wire is then moved in an upstream direction by operation of the feeder unit 4, thus stripping a slug 148 of insulation from the down-stream or leading end of the wire 2.

The cutting heads 76 and 76a are then moved apart through operation of the ball screw drive and the cutting blades 79 and 79a are pivoted back to their original vertical position. The apparatus is then in condition for a second sequence of cutting.

Figure 8I:
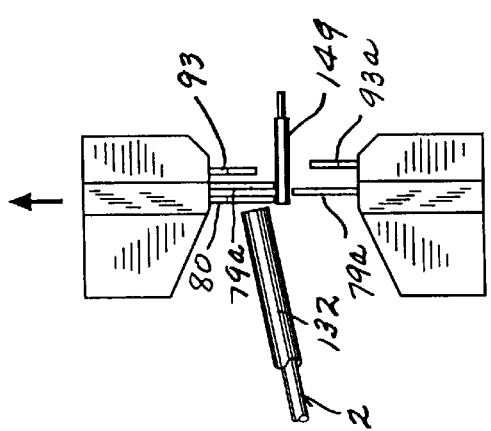

FIG. 8A–L shows a sequence of operations when stripping a longer slug of insulation from wire 2. In FIG. 8A, a given length of wire 2 is fed by feed unit 4 through the guide tube 132 into the cutting and stripping unit 5. The cutting heads 76, 76a are then moved in a direction toward each other causing cutting blades 79,79a to cut the wire, as shown in FIG. 8B, and provide a cut length 149.

The cutting heads 76,76a are then moved apart, as shown in FIG. 8C and the cutting blades 79 and 79a are then pivoted to the inoperative position, as illustrated in FIG. 8D. With the cutting blades in the pivoted position, the wire 2 is then fed across the cutting and stripping unit, as shown in FIG. 8E and the stripping blades 93,93a are then moved toward each other, as shown in FIG. 8F to cut the insulation on the leading end of the wire.

Figure 8L:
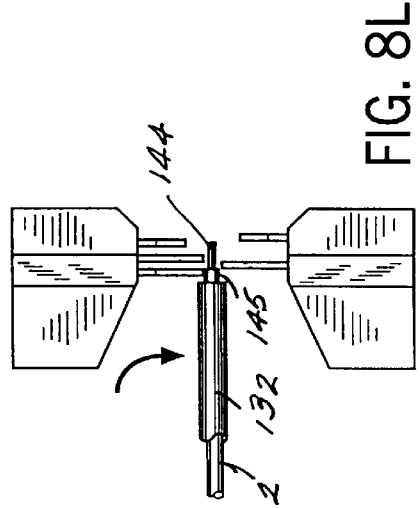
Figure 8H:
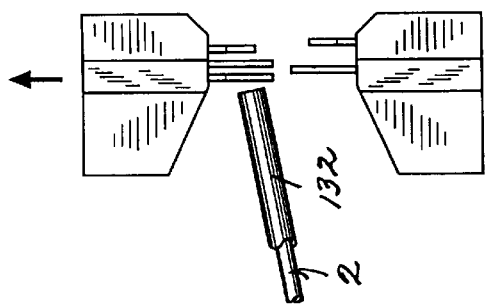
Figure 8K:
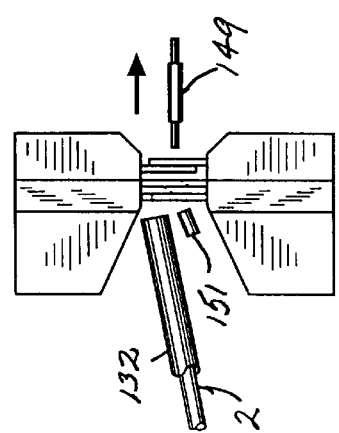
Figure 8G:
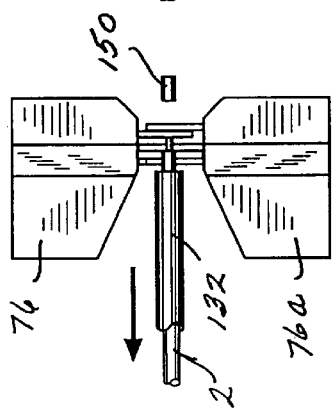

The wire is then moved in an upstream direction by feeder unit 4, as illustrated in FIG. 8G to strip a slug 150 of insulation from the leading end of the wire. The cutting heads 76,76a are then moved to an open position, as shown in FIG. 8H, and the guide tube 132 is pivoted upwardly through operation of solenoid 137. With the guide tube 132 in the upward pivoted position, the cut length of wire 149 is fed in an upstream direction, as shown in FIG. 8I, to move the trailing end of the cut length between the stripper blades 93,93a. At this time, the cutter blades 79,79a are still in the pivoted position.

Figure 8J:
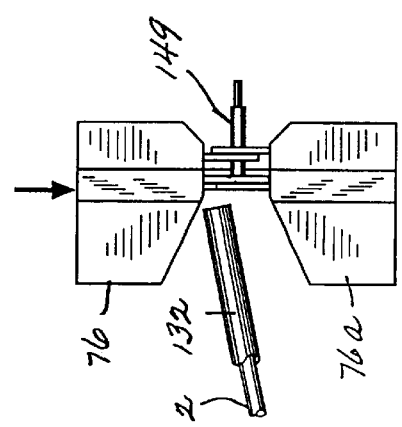

The stripping blades 93 and 93a are then moved to the closed position, as shown in FIG. 8J to cut the insulation, and the cut length of wire 149 is then moved in a downstream direction by feed unit 6 to strip a slug 151 of insulation from the trailing or upstream end of the cut length, as shown in FIG. 8K. Thus, the insulation has been cut and stripped from both the leading and trailing ends of the cut length 149 of wire. The guide tube 132 is then pivoted downwardly to its original position through operation of solenoid 137, as seen in FIG. 8L, and the cutter blades 79,79a are pivoted back to their original position by operation of the motors 86 to complete the sequence.

The apparatus of the invention utilizes a single pair of cooperating cutting blades and a single pair of stripping blades. By pivoting the cutter blades out of alignment with the path of travel of the wire, the length of the stripped insulation can be substantially increased.

By using separate cutting and stripping blades, as opposed to using a single pair of blades for both cutting and stripping, the stripping blades can be provided with unique configurations for hard to process wire.

The apparatus is capable of cutting and stripping wire of various gauges and can further be employed for cutting and stripping two wires in side-by-side relation, or flat cable, or tubing.

I claim:

1. In an apparatus for cutting and stripping insulated wire, a supporting structure, a cutting and stripping unit mounted on the supporting structure, feed means for feeding insulated wire in an axial path of travel to the cutting and stripping unit, said cutting and stripping unit including a pair of cutting heads located on opposite sides of the path of travel of said wire, said cutting and stripping unit also including a cutting blade carried by each head and a stripping blade carried by each head and spaced axially from said cutting blade, means for moving the heads in a linear direction toward and away from each other, said cutting blades cooperating when said heads are moved in a direction toward each other to sever the wire and said stripping blades cooperating when the heads are moved toward each other to cut insulation on the wire, mounting means for mounting each cutting blade for pivotal movement about a pivot axis disposed parallel to the path of travel of said wire from an aligned cutting position to a non-aligned position, and means operably connected to said cutting blades for pivoting the cutting blades from the aligned cutting position to the non-aligned position.

2. The apparatus of claim 1, wherein the stripping blades are located downstream of the cutting blades.

3. The apparatus of claim 1, wherein one of said heads also carries a backing blade spaced from the cutting blade with the space between the cutting blade and the backing blade disposed to receive the cutting blade of the other head when the heads are moved in a direction toward each other.

4. The apparatus of claim 1, wherein each cutting blade has a distal end with a generally V-shaped sharpened edge.

5. The apparatus of claim 1, wherein each pivot axis is off-set from the longitudinal center line of the respective cutting blade.

6. The apparatus of claim 5, and including stop means on each head and disposed to be engaged by the respective cutting blade when the cutting blade is in the aligned cutting position.

7. In an apparatus for cutting and stripping insulated wire, a cutting and stripping unit, feed means for feeding insulated wire in an axial downstream path of travel to said cutting and stripping unit, said feed means including a pair of endless belts disposed on opposite sides of said path of travel, actuating means for moving the belts in a direction toward each other to bring the belts into contact with said wire, drive means for driving each belt in an endless path to thereby advance and retract said wire, and torsion spring means operably connected to said actuating means for applying a resilient force through said belts against said wire, said actuating means comprising a slide block operably connected to each belt, and an endless drive operably connected to said blocks, said torsion spring means being connected to said endless drive in a manner such that operation of said endless drive to move the blocks and the belts toward each other will increase the force of said torsion spring to exert a resilient force against the wire.

8. The apparatus of claim 7, wherein said endless drive includes a link chain connected to said blocks, and a reversible drive member operably connected to said link chain, operation of said drive member in one direction moving said blocks and said belts in a direction toward each other and operation of said drive member in the opposite direction moving said blocks and said belts in a direction away from each other.

9. The apparatus of claim 7, wherein said drive member includes a rotatable drive shaft, said torsion spring connected between the drive shaft and a fixed object.

10. The apparatus of claim 7, wherein said belts comprise timing belts and said drive means includes a pair of first timing pulleys operably connected to each belt, a pair of second pulleys journaled on each block, a pulley shaft connecting each first pulley with a second pulley, said drive means also including an endless driven member interconnecting the second pulleys on both of said blocks to thereby drive the second pulleys in synchronization.

11. The apparatus of claim 1, and including a guide tube assembly located between said feed means and said cutting and stripping unit for guiding the wire to said cutting and stripping unit, pivot means for mounting the guide tube assembly for pivotal movement between a guiding position where said guide tube assembly guides the wire to said cutting and stripping unit and a non-guiding position, and means for pivoting the guide tube between said guiding and non-guiding positions.

12. The apparatus of claim 11, wherein said guide tube assembly comprises a cradle fixed to the supporting structure and having an open side, said assembly also including an elongated guide tube, and means to removably secure said guide tube in the open side of said cradle.

13. The apparatus of claim 12, wherein said means to removably secure said guide tube comprises a detent.

14. In an apparatus for cutting and stripping insulated wire, a cutting and stripping unit, feed means for feeding an insulated wire in a downstream axial direction to said cutting and stripping unit, said cutting and stripping unit including a pair of heads located on opposite sides of the direction of movement of said wire, each head including a cutting blade and a stripping blade spaced axially from said cutting blade, drive means for moving the heads in a direction toward and away from each other to cause said cutting blades to cut said wire and to cause said stripping blades to cut said insulation in a programmed sequence, said drive means including a screw having opposite threads at opposite ends thereof, nut means engaged with each thread, each nut means being operably connected to one of said heads, said drive means also including reversible means for rotating said screw to thereby move said heads in a direction toward and away from each other, and resilient means interconnecting said heads for taking up slack in the screw and nut drive, said resilient means being operably connected to said heads in a manner such that movement of said heads in a direction toward each other will increase the force of said resilient means.

15. The apparatus of claim 14, wherein each nut means comprises a nut engageable with the respective thread, a block to carry said nut, and guide means for guiding each block and nut in movement in a direction toward and away from the direction of movement of said wire.

16. The apparatus of claim 15, wherein said resilient means comprises a spring carried by one of said blocks and disposed to be engaged by the other of said blocks as said blocks are moved in a direction toward each other.

17. The apparatus of claim 1, and including means on each cutting blade and engageable with the respective cutting head for preventing each cutting blade from pivoting from the aligned cutting position to the non-aligned position when said cutting blades are moved into cooperating relationship to sever the wire.

* * * * *